United States Patent Office 3,575,942
Patented Apr. 20, 1971

3,575,942
METHOD OF RECOVERING A POLYMERIC PRODUCT
C. Michael Fontana, Washington, W. Va., assignor to Borg-Warner Corporation, Chicago, Ill.
No Drawing. Filed July 25, 1968, Ser. No. 747,431
Int. Cl. C08f 1/88, 19/00
U.S. Cl. 260—78.5   4 Claims

ABSTRACT OF THE DISCLOSURE

A method of recovering and purifying polymeric products comprising heating a polymer reaction product in the presence of sufficient water to form at least a partial solution of the polymer in water and cooling to effect a phase separation into a lower liquid phase containing concentrated polymer and an upper liquid phase containing reaction product impurities in water. The method is particularly adapted to the separation and purification of copolymers of maleic anhydride and derivatives thereof copolymerized with given conjugated dienes.

BACKGROUND

Prior to this invention, maleic anhydride-conjugated diene copolymers were known and various copolymers were prepared such as those set forth in British Pat. 561,645 and U.S. Pat. 2,967,174. Also, copolymers of maleic acid half esters with conjugated dienes were prepared as set forth in U.S. Pat. 2,967,174. The prior art also taught that maleic anhydride copolymers could be converted to maleic acid half ester copolymers, similar in properties to copolymers prepared directly from the half esters, by reaction of the anhydride with an alcohol. Copolymers of conjugated dienes with maleic anhydride derivatives such as chloromaleic anhydride have been described in U.S. Pat. 2,540,072. Conjugated dienes such as piperylene have also been copolymerized with monochloromaleic anhydride and dichloromaleic anhydride as set forth in U.S. Pat. 2,461,679.

The aforementioned copolymers are used in a variety of applications such as in coatings, adhesives, impregnants for textiles and leather, additives for lubricants, shaped articles, moldings and the like.

The polymeric reaction product of the copolymerization of maleic anhydride and derivatives thereof with various conjugated dienes was, prior to this invention, normally recovered by evaporation of the solvent used in synthesis or by precipitation with non-solvents such as ether, petroleum ether, etc., followed by drying and conversion to the desired derivatives. Because of the amorphous nature of these polymeric products, removal of solvent or drying was difficult and time consuming. Also, after the polymer was dry, the subsequent conversion to soluble derivatives such as water soluble salts was extraordinarily difficult. Further, the polymeric reaction products often contained appreciable amounts of Diels-Alder adduct byproduct, which was necessarily or desirably removed for many applications.

In view of the difficulties encountered in recovering and purifying the polymeric materials as well as converting them to their water soluble salts, the isolation and separation processes have, prior to this invention, been quite uneconomical.

SUMMARY OF THE INVENTION

Briefly described, this invention is a method of separating the components of the reaction product of maleic anhydride and derivatives thereof with given conjugated dienes by using steam or hot water as a solvent. The method comprises the steps of distilling or steaming out extraneous solvent in the reaction product while simultaneously effecting hydrolysis of the reaction product in the hot water. Upon cooling, the product separates into a two-phase mixture with the polymer phase forming the lower liquid phase of the solution and the water and impurities forming the upper liquid phase of the solution. The phases are separated by decantation and the hydrolyzed copolymer in the lower phase is converted to its water soluble salt such as the alkali metal salt, amine salt or ammonium salt by mixing with the appropriate base as for example, concentrated ammonium hydroxide, ammonia, amine, or a hydroxyalkylamine.

The conjugated dienes that are useful in preparing the copolymers of this invention comprise compounds having the general structural formula:

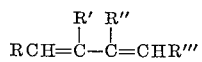

wherein R, R′, R″ and R‴ may be the same or different and represent a radical from the group consisting of hydrogen, halogen, alkoxyl, aryl, cycloalkyl or alkyl radicals having from 1 to 8 carbon atoms, and preferably from 1 to 3 carbon atoms. Illustrative conjugated dienes include butadiene, isoprene, substituted butadienes such as 2 - chloro-1,3-butadiene; 2,3-dichloro-1,3-butadiene; 2,3-dimethyl-1,3-butadiene; 1-methoxy-1,3-butadiene, piperylene and the like.

The maleic anhydride derivatives that are useful for preparing the copolymers of this invention, other than maleic anhydride, comprise monochloromaleic anhydride, dichloromaleic anhydride and saturated half esters of maleic acid containing from 1–18 carbon atoms and preferably 1–8 carbon atoms.

In general, the molar ratio of conjugated diene to maleic anhydride or maleic anhydride derivative that are reacted will range from 1.2:1 to 1:1 since it has been determined that upon completion of the polymerization reaction, the copolymers contain maleic anhydride or maleic anhydride derivative and the conjugated diene in a nearly 1:1 molar ratio.

The reaction for preparing the copolymers of this invention may be carried out in the presence of any suitable solvent. The solvent is preferably one having a boiling point lower than that of water to enable the solvent to be removed by boiling or steaming. Solvents having a boiling point somewhat higher than that of water may also be employed provided they can be readily steam distilled out of the reaction product. Water, itself, is a suitable solvent for preparing copolymers of maleic acid half esters. When anhydrides are used, the solvents should also be inert toward the anhydride moiety. Suitable inert solvents that may be used with anhydride are polar solvents such as ketones, esters and ethers. Specific solvents such as acetone, methyl ethyl ketone, tetrahydrofuran, and the like have been found useful, however, economics may govern the specific solvent that is to be utilized and acetone has been preferred due to its excellent separability and availability. The polar solvents are generally preferred since they are usually solvents for the copolymer as well as for the monomers and therefore, will maintain a homogeneous phase throughout the reaction.

The polymerization processes that produce the copolymers suitable for the application of this invention generally utilize free radical generating catalysts that minimize the formation of Diels-Alder adduct byproduct. Free radical polymerization catalysts that are useful are compounds such as tertiary butyl peroxypivalate, benzoyl peroxide, lauryl peroxide, azo-bis-isobutyronitrile, and the like.

In accordance with this invention, after the polymerization has been completed, the reaction product is converted to water soluble derivatives by the method described above. Optionally, it may be desirable to pretreat the reaction product before applying the method of this invention. For example, in the preparation of butadiene-maleic anhydride copolymer in acetone solvent, it may be desirable to recover some of the unhydrolyzed adduct byproduct. This can be done by precipitating the copolymer with a suitable non-solvent such as benzene and recovering acetone, benzene and adduct from the separated upper phase by distillation at atmospheric or reduced pressure. The precipitated polymeric mixture containing both solvents can then be treated by the method of this invention.

While the method of the invention has been described in terms of a single phase separation, the steps of the method can be repeated any number of times to obtain purer and purer polymer concentrates. Also, the concentrate can be post treated as, for example, by conventional countercurrent extraction with water at room temperature. Since the lower phase polymer concentrate is usually cloudy due to suspension of minute droplets of upper phase, it may be desirable to post treat to remove an additional amount of water. This may be accomplished by vacuum flashing, purging with a stream of dry inert gas, or other suitable means to obtain a clear polymer concentrate. It has been found that multiple treatments are successful to a point beyond which one does not obtain phase separation but rather the formation of a latex. Successful phase separation at that point depends on the presence of a small amount of electrolyte of at least moderate ionization strength such as maleic acid which is normally present in many products in minor concentrations. Further, it has been found that less than one percent by weight of many common neutral or acidic electrolytes such as sodium chloride, ammonium chloride, sulfuric acid, hydrochloric acid, etc., are effective in breaking down the latex or preventing its formation. A basic electrolyte such as sodium hydroxide cannot be used to break the latex, since it converts the polymer to a water-soluble polyelectrolyte which will not phase separate.

It will be understood that the copolymer products useful for treatment by this invention are unsaturated and active catalyst residues may remain in the reaction mixture which may lead to crosslinking of the polymer product. This difficulty is overcome by the addition of a small amount of antioxidant prior to treatment by the method of this invention. A very effective antioxidant which has the additional advantage of not forming color bodies is 2,6-ditertiary-butyl-4-methyl-phenol used in amounts of less than one weight percent of the polymeric product.

The efficiency of separating adduct from the copolymers depends to some extent on the monomers used to form the copolymer. For example, it has been found that with copolymer products of simple dienes like butadiene with maleic acid half esters made from alcohols with long alkyl chains, the separating efficiency decreases as the alkyl chain of the ester group increases beyond about eight carbon atoms. Likewise, the separating efficiency with copolymers of maleic anhydride with substituted butadiences would be expected to decrease as the carbon atoms of the total combined R groups of the substituted butadiene exceed about eight.

With the simpler and more common copolymers such as a butadiene-maleic anhydride copolymer, the separating efficiency depends on a number of other factors, the principal ones being the ratio of adduct to polymer in the reaction product and the relative amount of water used in the process. It has been found that separation will not take place if the relative amount of adduct to copolymer is greater than about 1:1 by weight and the amount of water left in the hot mixture is less than about 1:1 by weight of water to total solids. Under these conditions, the hydrolyzed adduct may itself slowly crystallize out of the mixture at room temperature. It appears that the hydrolyzed adduct has a limited solubility in the water copolymer medium and also functions as an agent capable of compatibilizing the copolymer with water. The copolymer concentrate can, however, be separated out of products containing very low amounts of copolymers such as 20–25 weight percent of solids if a sufficient amount of water is used. Generally, the process of this invention works well where the solids content of the hot water mixture is about 10 weight percent or in the range of 5–20 weight percent total solids and under these conditions very high separating efficiencies may be attained.

The method of this invention will be clearly understood in view of the following examples which illustrate the separation of the polymer as well as the conversion to the salts of the polymer. In these examples, the copolymer reaction products were prepared by different methods. Copolymer reaction products were characterized by copolymer composition, reaction solvent and amount used in synthesis, polymer yield (weight percent based on total solids, the remaining solids being mainly the adduct) and polymer inherent viscosity (as measured at 0.2 gram per deciliter concentration in dimethylformamide at 25° C.).

Polymer yields were determined by precipitating a portion of the reaction product with benzene, redissolving the polymer in acetone and reprecipitating with benzene. The polymer recovered after double precipitation as well as the remaining liquids were boiled to near dryness and further freed of solvents in a vacuum oven. Yield of polymer, as weight percent of total solids, was determined from the dry weights and a sample of the polymeric material was used for inherent viscosity determination.

EXAMPLE 1

311.7 grams of a reaction product of butadiene with maleic anhydride, containing 67.4 weight percent acetone solvent and a copolymer of 0.31 inherent viscosity (IV) in about 65 percent yield, was boiled vigorously while 200 g. of water were added over a period of about one hour as the acetone was distilled overhead. A clear, pale yellow solution resulted, which did not phase separate upon cooling to room temperature. Phase separation began to occur at room temperature with the addition of about 125 ml. of water. An additional 150 ml. of water were added with some heating and the resulting solution was allowed to cool to room temperature. The two phases were separated into 237.1 g. of upper phase containing 23 g. of crystallizable solids and a lower phase of 308.8 g.

A second extraction was made by adding 198.2 g. of water to the lower layer, heating to a single phase and cooling back to room temperature. The extract (upper phase) of 277.2 g. was decanted and boiled to dryness to yield 10.2 g. of solids which appeared to be mostly adduct. The lower layer, a viscous polymer phase, was neutralized with 54 g. concentrated ammonium hydroxide (28 percent ammonia) to yield a clear, viscous solution containing 32.2 weight percent solids.

Example 1 illustrates that phase separation will not occur unless a sufficient amount of water has been added and further illustrates the effectiveness of multiple extraction. Evidently 23 g. of a total of 113.6 g. of hydrolyzed solids or 20.2 percent of hydrolyzed adduct was extracted in the first step while an additionad 9.0 percent was extracted in the second step for a total of 29.2 percent. It is thus seen that most of the hydrolyzed adduct byproduct was extracted and that the polymer concentrate lower phase was readily converted into the ammonium salt.

Examples 2 through 7 (Table I) further illustrate the effectiveness of the method of this invention in converting reaction products of butadiene copolymerized with maleic anhydride in acetone medium, into viscous polymer concentrates and their further conversion to various salt derivatives. The procedure set forth above was utilized in each example.

TABLE I

| | Example Number | | | | | |
|---|---|---|---|---|---|---|
| | 2 | 3 | 4 | 5 | 6 | 7 |
| Polymer inherent viscosity | 0.52 | 0.31 | 0.52 | 0.49 | 0.49 | 0.49 |
| Polymer yield (percent) | 60.7 | 65.0 | 60.7 | 30.1 | 55.5 | 55.5 |
| Polymer-acetone solution taken (grams) | 1,164 | 1,144 | 1,178 | 1,955 | 1,392.5 | 1,052 |
| Treatment: | | | | | | |
| $H_2O$ added to 100° C. (ml.) | 1,385 | 525 | 1,250 | 1,900 | 1,200 | 1,000 |
| Time to 100° C. (hrs.) | 3.20 | 2.58 | 3.27 | 2.38 | 2.00 | 2.80 |
| $H_2O$ added at 100° C. (ml.) | 1,365 | 1,850 | 1,500 | 3,400 | 2,000 | 1,250 |
| Time at 100° C. (hrs.) | 0.65 | 0.68 | 2.27 | 2.07 | 2.00 | 1.50 |
| Phase separation: | | | | | | |
| Upper phase (grams) | 1,896 | 1,851 | 1,873 | 4,128 | 3,500 | 2,150 |
| Percent solids | 6.78 | 7.19 | 7.26 | 7.07 | 5.75 | 6.59 |
| Lower phase (grams) | 887.5 | 759 | 887 | 902 | 876 | 632 |
| Added to lower phase | [1] | [1] | [2] | [2] | [1] | |
| Amount added (grams) | 211.3 | 206 | [3] 19.8 | [3] 85.8 | 200 | 0.00 |
| Total concentrate (grams) | 1,098.5 | 965 | 930.2 | 1,108.8 | 1,076 | 632 |
| Properties of concentrate: | | | | | | |
| Weight percent solids | 31.7 | 36.4 | 33.5 | 28.26 | 30.0 | 31.5 |
| pH | 7.0 | 7.0 | 3.3 | 6.0 | 8.2 | 2.5 |
| Viscosity at 25° C. (cps.) | | 1,180 | 3,580 | 1,445 | | |
| Process efficiency: | | | | | | |
| Percent solids recovered in concentrate (acid form) | 69.3 | 68.8 | 68.7 | 47.7 | 57.2 | 58.4 |

[1] Concentrated $NH_4OH$.
[2] NaOH solution.
[3] NaOH.

To further illustrate the effectiveness of the method of this invention in terms of recovery of polymeric materials, reaction products of butadiene with maleic anhydride, which had been recovered by precipitation of polymer from a polymer-acetone reaction product and dried, were redissolved in acetone and processed. The results are given in Examples 8, 9, and 10 of Table II.

TABLE II

| | Example Number | | |
|---|---|---|---|
| | 8 | 9 | 10 |
| Inherent viscosity (IV) | 0.48 | 0.38 | 0.38 |
| Polymer yield (percent) | 65.6 | 65 | 66.5 |
| Starting materials: | | | |
| Polymer (grams anhydride) | 230 | 497 | 939.5 |
| Acetone solution (grams) | 1,148 | 2,008 | 2,509 |
| Solution after filtering (grams) | 1,144 | 1,882 | 2,256 |
| Treatment: | | | |
| $H_2O$ added to 100° C. (grams) | 1,000 | 6,600 | 5,250 |
| Time to 100° C. (hours) | 1.93 | 3.25 | 2.25 |
| $H_2O$ added at 100° C. (grams) | 2,250 | 0.0 | 2,250 |
| Time at 100° C. (hours) | 4.00 | 1.25 | 1.25 |
| Water solution (grams) | 2,705 | 5,025 | 5,103 |
| Phase separation: | | | |
| Upper phase (grams) | 1,956 | 3,686 | 2,265 |
| Weight percent solids | 0.87 | 1.06 | 1.64 |
| Lower phase (grams) | 749 | 1,339 | 2,838 |
| Concentrated $NH_4OH$ added (grams) | 157.2 | 316 | 625 |
| Concentrate (grams) | 906.2 | 1,655 | 3,463 |
| Properties of concentrate: | | | |
| Weight percent solids | 28.8 | 32.77 | 31.80 |
| pH | 7.0 | 8.0 | 8.0 |
| Viscosity at 25° C. (cps.) | 3,950 | 3,360 | 2,610 |
| Process efficiency: | | | |
| Percent solids (acid form) recovered in concentrate | 92.7 | 92.0 | 96.1 |

Examples 8, 9 and 10 show relatively little loss of polymer even when using large amounts of water. The losses which occur do not necessarily represent loss of polymer since the starting polymers were not entirely free of adduct.

In order to ascertain precisely the effectiveness of the method of polymer product recovery, an analytical method for the analysis of hydrolyzed polymer, hydrolyzed adduct and maleic acid was developed. A liquid phase chromatograph adsorption method was developed using columns packed with activated carbon, and using base titration of the eluted product fractions. In the following two examples, analyses were carried out on the homogeneous water solution as well as on each of the two phases after phase separation.

EXAMPLE 11

1805 g. of a reaction product of butadiene with maleic anhydride in acetone solution was converted into 4583 g. of a hot, homogeneous water solution, sampled for analysis, and phase separated. The results of the analyses are given in Table III.

TABLE III

| | Total system | Upper phase | Lower phase |
|---|---|---|---|
| Weight of phase (grams) | 4,483 | 3,437.3 | 1,045.7 |
| Composition (milliequivalents of acid in): | | | |
| Polymer fraction | 4,089 | 174 | 3,957 |
| Adduct fraction | 1,121 | 749 | 328 |
| Maleic acid fraction | 286 | 128 | 178 |
| Total | 5,496 | 1,051 | 4,463 |
| Composition (weight, percent): | | | |
| Hydrolyzed polymer | 7.75 | 0.43 | 32.41 |
| Hydrolyzed adduct | 2.13 | 1.85 | 2.68 |
| Maleic acid | 0.37 | 0.29 | 0.99 |
| Total solids (weight, percent) | 10.25 | 2.57 | 36.08 |

The results show that 96.8 percent of the polymer was recovered in the concentrate while the polymer concentration (on the basis of total solids) was increased from 75.7 weight percent to 89.8 weight percent and the solids content was increased from 10.3 to 36.1 weight percent in the concentrate. The weight percent polymer was calculated on the basis of a 1:1 maleic anhydride:butadiene mole ratio.

EXAMPLE 12

1487.5 g. of a reaction product in acetone solution was treated in accordance with the invention to yield 4423 g. of a hot, homogeneous water solution which was phase separated by cooling to room temperature after sampling for analysis. Analyses are set forth in Table IV.

TABLE IV

| | Total solution | Upper phase | Lower phase |
|---|---|---|---|
| Weight of phase (grams) | 4,323 | 3,423 | 900 |
| Composition (milliequivalents of acid in): | | | |
| Polymer fraction | 3,659 | 223 | 3,463 |
| Adduct fraction | 1,871 | 1,377 | 495 |
| Maleic acid fraction | 631 | 427 | 198 |
| Total | 6,161 | 2,027 | 4,156 |
| Composition (weight percent): | | | |
| Hydrolyzed polymer | 7.20 | 0.55 | 32.74 |
| Hydrolyzed adduct | 3.68 | 3.42 | 4.68 |
| Maleic acid | 0.85 | 0.72 | 1.28 |
| Total solids (weight percent) | 11.73 | 4.69 | 38.70 |

In this example, 94.6 weight percent of the polymer was recovered in the concentrate while the polymer concentration was increased from 61.4 to 84.6 weight percent and the solids content was increased from 11.7 to 38.7 weight percent.

It will be noted that the process set forth in the foregoing example, as applied to copolymers of butadiene with maleic anhydride in acetone solution, illustrates the capability of converting a hot water solution containing less than 8 weight percent polymer to a polymer concentrate containing more than 30 weight percent polymer with a polymer recovery of 94–97 percent. During the process, the anhydride containing polymer is hydrolyzed. The acetone solvent can be recovered quantitatively and most of the adduct byproduct may be removed. The polymer concentrate can be readily converted to any water soluble salt or derivative. The examples set forth below illustrate how the method of this invention may be applied to other copolymers prepared in other solvents.

EXAMPLE 13

82.6 g. of an isoprene-maleic anhydride copolymer which had been synthesized in p-dioxane solvent, precipitated with benzene and dried, was dissolved in 149.6 g. of acetone and processed by the method of this invention. 386.5 g. of upper phase containing 9.2 percent solids (mostly adduct) and 105.2 g. of a viscous lower phase containing 44.9 percent polymeric solids was recovered. The product recovered in the conventional manner contained about 43 percent adduct and an appreciable amount of solvent, both of which were removed by the method of this invention.

In the following Examples 14 through 17 250 g. aliquots of a product of the reaction of butadiene with maleic anhydride in acetone solution were reacted with a molar excess of each of the alcohols, methyl, ethyl, n-butyl and 2-ethyl-1-hexyl by refluxing for about one hour. The product of this reaction was processed by the method of the invention using extensive steaming to remove the excess of higher alcohols. The original reaction mixture in acetone was ascertained to contain 30.6 weight percent of anhydrous solids, 73.7 percent of which was butadiene-maleic anhydride copolymer of 0.59 inherent viscosity. The results obtained on application of the method of the invention to the half esters are given in Table V. In each case, a viscous lower layer containing mainly polymeric solids and a non-viscous upper layer containing mainly low molecular weight, non-polymeric solids was obtained.

TABLE V

| Alcohol | Upper phase weight (grams) | Lower phase weight (grams) | Upper phase solids (grams) | Lower phase solids (grams) | Percent of solids extracted |
|---|---|---|---|---|---|
| Example: | | | | | |
| 14 Methanol | 317.1 | 176.1 | 14.4 | 59.8 | 19.4 |
| 15 Ethanol | 319.2 | 194.1 | 14.0 | 62.9 | 18.2 |
| 16 n-Butanol | 319.3 | 187.3 | 10.3 | 63.0 | 14.1 |
| 17 2-ethylhexanol-1 | 271.2 | 223.1 | 7.6 | 79.4 | 8.7 |

It may be noted from the foregoing examples that the efficiency of extraction of low molecular weight byproducts decreases as the molecular weight of the alcohol used in forming the half esters increases. However, a substantial amount may be extracted from a product containing the half ester of an alcohol containing eight carbon atoms.

EXAMPLE 18

46.2 g. chloromaleic anhydride and 100 g. p-dioxane was charged into a three-necked, 500 ml. flask equipped with stirrer, Dry Ice reflux condenser, heating mantle, and entry tube. A solution containing 15 g. butadiene, 75 g. p-dioxane and 1.8 g. benzoyl peroxide was prepared in a separate vessel, pressurized with nitrogen and connected to the inlet tube. The contents of the pressurized vessel were added to the stirred reactor while refluxing at 101–103° C. over a period of thirty-one minutes.

The reaction product was treated and steamed with excess water in accordance with the method of this invention until all the p-dioxane was removed. The product was allowed to cool to room temperature and phase separation occurred forming 392.1 g. of an upper phase containing 3.8 percent solids and 88.7 g. of a viscous lower phase containing 40 percent polymeric solids.

EXAMPLE 19

Utilizing the same apparatus as used in Example 18, 57.0 g. of dichloromaleic anhydride and 100 g. cyclohexanone was charged to the flask. The pressurized vessel was charged with 19.0 g. butadiene, 125.4 g. cyclohexanone and 3.0 g. benzoyl peroxide. The contents of the pressurized vessel were added to the stirred reactor while refluxing at about 150° C. over a period of 24 minutes. The products were treated in accordance with the method of the invention until most of the cyclohexanone had been steamed out. Upon cooling and phase separation, 430.5 g. of an upper layer containing 0.92 percent solids and 60.5 g. of a dark viscous lower layer containing 57.8 percent polymeric solids were obtained.

It will be understood by those skilled in the art that the invention has been described in connection with certain specific embodiments thereof, such as maleic anhydride reacted with butadiene, however, this is by way of illustration and not by way of limitation and the scope of the invention is defined solely by the appended claims which should be construed as broadly as is consistent with the prior art.

What is claimed is:

1. A method of recovering a purified polymer concentrated in liquid form from the reaction product of a conjugated diene copolymerized with a compound selected from the group consisting of maleic anhydride, chloromaleic anhydride, dichloromaleic anhydride and half esters of maleic acid comprising the steps of adding water in an amount greater than a ratio of 1:1 by weight water to total solids present in the reaction product, said water being in liquid or gaseous form, while maintaining the amount of copolymer to adduct being formed greater than a ratio of 1:1 by weight copolymer, heating said product and steaming out extraneous solvents, cooling the mixture to cause separation of a two phase mixture with the polymer phase forming the lower phase and the water and impurities forming the upper phase and separating said phases.

2. The method of claim 1 wherein the conjugated dienes are selected from the group represented by

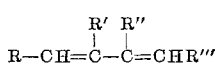

wherein R, R', R'' and R''' are radicals selected from the group consisting of hydrogen, halogen, alkoxyl, aryl, cycloalkyl and alkyl radicals containing from 1–8 carbon atoms.

3. The method of claim 1 wherein the diene is isoprene.

4. The method of claim 1 wherein the diene is butadiene and the compound with which the diene is copolymerized is maleic anhydride.

References Cited

UNITED STATES PATENTS

| 2,725,367 | 11/1955 | Niederhauser | 260—78.5 |
| 2,967,174 | 1/1961 | Bartl | 260—78.5 |
| 3,250,751 | 5/1966 | Brady et al. | 260—78.5 |
| 2,383,399 | 8/1945 | Lundquist | 260—78 |

JOSEPH L. SCHOFER, Primary Examiner

J. KIGHT, Assistant Examiner